US009880551B2

(12) United States Patent
Lacaze et al.

(10) Patent No.: US 9,880,551 B2
(45) Date of Patent: Jan. 30, 2018

(54) POINT-AND-CLICK CONTROL OF UNMANNED, AUTONOMOUS VEHICLE USING OMNI-DIRECTIONAL VISORS

(71) Applicants: Alberto Daniel Lacaze, Potomac, MD (US); Karl Nicholas Murphy, Rockville, MD (US)

(72) Inventors: Alberto Daniel Lacaze, Potomac, MD (US); Karl Nicholas Murphy, Rockville, MD (US)

(73) Assignee: ROBOTIC RESEARCH, LLC, Gaithersburg, MD (US)

( * ) Notice: Subject to any disclaimer, the term of this patent is extended or adjusted under 35 U.S.C. 154(b) by 0 days.

(21) Appl. No.: 14/989,599

(22) Filed: Jan. 6, 2016

(65) Prior Publication Data

US 2016/0259330 A1    Sep. 8, 2016

Related U.S. Application Data

(60) Provisional application No. 62/129,471, filed on Mar. 6, 2015.

(51) Int. Cl.
  *G05D 1/00* (2006.01)
  *G08C 17/02* (2006.01)
(52) U.S. Cl.
  CPC ........ *G05D 1/0016* (2013.01); *G05D 1/0038* (2013.01); *G05D 1/0044* (2013.01); *G08C 17/02* (2013.01)
(58) Field of Classification Search
  None
  See application file for complete search history.

(56) References Cited

U.S. PATENT DOCUMENTS

| | | | | |
|---|---|---|---|---|
| 6,333,826 B1* | 12/2001 | Charles | ................... | G02B 13/06 359/725 |
| 8,160,747 B1* | 4/2012 | Blackwell | ................ | B25J 9/162 700/245 |
| 9,380,275 B2* | 6/2016 | Davidson, Jr. | ......... | H04N 7/183 |
| 2002/0101568 A1* | 8/2002 | Eberl | ................... | G02B 27/017 351/211 |
| 2008/0266254 A1* | 10/2008 | Robbins | ............... | G05D 1/0016 345/161 |
| 2010/0259614 A1* | 10/2010 | Chen | ................... | G05D 1/0038 348/148 |
| 2010/0292868 A1* | 11/2010 | Rotem | .................. | G06T 7/2033 701/2 |
| 2011/0261193 A1* | 10/2011 | Agurok | ................... | F41H 13/00 348/135 |

(Continued)

*Primary Examiner* — Rodney A Butler
*Assistant Examiner* — Tamara L Weber
(74) *Attorney, Agent, or Firm* — White-Welker & Welker, LLC; Matthew T. Welker, Esq.

(57) ABSTRACT

The proposed method outlines a new control mechanism well-suited for small, unmanned aerial vehicles traversing in a GPS-denied areas. It has the strong advantage of simplifying the interface, so that even an untrained operator can handle the difficult, dynamic problems encountered in closed quarters. The proposed system seamlessly integrates point-and-click control with way-point navigation, in an intuitive interface. An additional advantage of the proposed system is that it adds minimal hardware to the payload of the UAV, and can possibly, strongly diminish the bandwidth and delay effects of the communication channel.

14 Claims, 4 Drawing Sheets

(56) References Cited

U.S. PATENT DOCUMENTS

| | | | | |
|---|---|---|---|---|
| 2012/0287284 A1* | 11/2012 | Jacobsen | ............... | G06F 1/163 348/158 |
| 2013/0176423 A1* | 7/2013 | Rischmuller | ........ | G05D 1/0038 348/114 |
| 2014/0327770 A1* | 11/2014 | Wagreich | ............ | G05D 1/0038 348/148 |
| 2015/0142211 A1* | 5/2015 | Shehata | ................ | H04N 7/181 701/2 |
| 2015/0350614 A1* | 12/2015 | Meier | ................... | H04N 7/188 348/144 |

* cited by examiner

POINT-AND-CLICK CONTROL OF UNMANNED, AUTONOMOUS VEHICLE USING OMNI-DIRECTIONAL VISORS

CROSS REFERENCE TO RELATED APPLICATIONS

This application claims priority from U.S. Patent Application Ser. No. 62/129,471, entitled "Point-and-Click Control of Unmanned, Autonomous Vehicle Using Omni-Directional Visors", filed on 6 Mar. 2015. The benefit under 35 USC §119(e) of the U.S. provisional application is hereby claimed, and the aforementioned application is hereby incorporated herein by reference.

SEQUENCE LISTING OR PROGRAM

Not Applicable

TECHNICAL FIELD OF THE INVENTION

The present invention relates generally to control of autonomous vehicles. More specifically, the present invention relates to control of autonomous vehicles using omni-directional visors.

BACKGROUND OF THE INVENTION

Outdoor control of UAVs is normally accomplished using GPS. Usually, the operator has a map of the area where he/she is interested in sending the UAV. By selecting a series of waypoints on the map, it delineates the trajectory followed by the UAV. This trajectory is usually in two dimensions, and it assumes that GPS is available throughout the execution of the plan. The operator then decides whether the UAV should land or loiter at the end of the trajectory.

If GPS is jammed or not available, the current state-of-the-art—for small UAVs—is to teleoperate. Larger UAVs (like the Predator) are capable of maintaining localization for longer periods of time, due to the accurate, expensive, and heavy inertial navigation units they carry. On the small UAVs, this is not a choice. The MEMS-based inertial units (which fit the SWAP of the small vehicles) have enough inertial biases that they are not capable of flying without GPS, or at least not with sufficient accuracy. Therefore, teleoperation is the customary fall-back control methodology.

Teleoperation can be done two ways; one way is when the operator has direct line of sight (usually called remote control). This method is performed when the operator looks directly at the flying vehicle, and uses a joystick to control its position—as well as counteract the effects of wind and aerodynamics. A second mechanism, usually called FPV (First-Person View), is used when the operator controls through an onboard camera, which is then relayed through a communication channel to the OCU (Operator Control Unit) carried by the operator.

For indoor applications, the choices are more limited. GPS is not available, and the UAVs capable of navigating in indoor scenarios cannot carry these larger, accurate IMUs. Therefore, the most common technique used for indoor missions is vehicle teleoperation. Teleoperation indoors is not trivial; the proximity of walls, and even the ground itself, create aerodynamic effects, which—in some cases—severely affect the controls of the UAV. Therefore, only trained operators can be used, and even under those conditions, safe control of the UAVs is not always accomplished.

Although autonomous mobility is the "Holy Grail" of autonomous robotic control in indoor and underground facilities, this is still to be accomplished. There are two main issues keeping autonomous mobility from being widespread. One, the sensors necessary for providing full, autonomous mobility, in an indoor facility, and are expensive and heavy. Two—and most importantly—the localization techniques for indoor navigation are hampered by the reduced SWAP. If a sufficient number of sensors is added to a quadrotor, capable of accurately mapping and localizing in an indoor facility, the cost and size of the UAV tends to make it unviable from a tactical standpoint.

SUMMARY OF THE INVENTION

The proposed system is a point-and-click control method, where the operator selects a point in the image for the quadrotor to traverse. The operator selects a distance, and the quadrotor will traverse a straight (or curved) line between its current location and the point selected in the image. In the proposed system, the point selection is performed using a set of virtual reality stereo goggles (i.e. Oculus Rift). The operator is given an omni-directional image, where—by moving his/her head around—he/she can observe the area surrounding the UAV. The glove is used as a virtual mouse, selecting the point where the operator desires the UAV to go, as well as a selecting how far, in that direction, the quadrotor should automatically move.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Figure 1A:
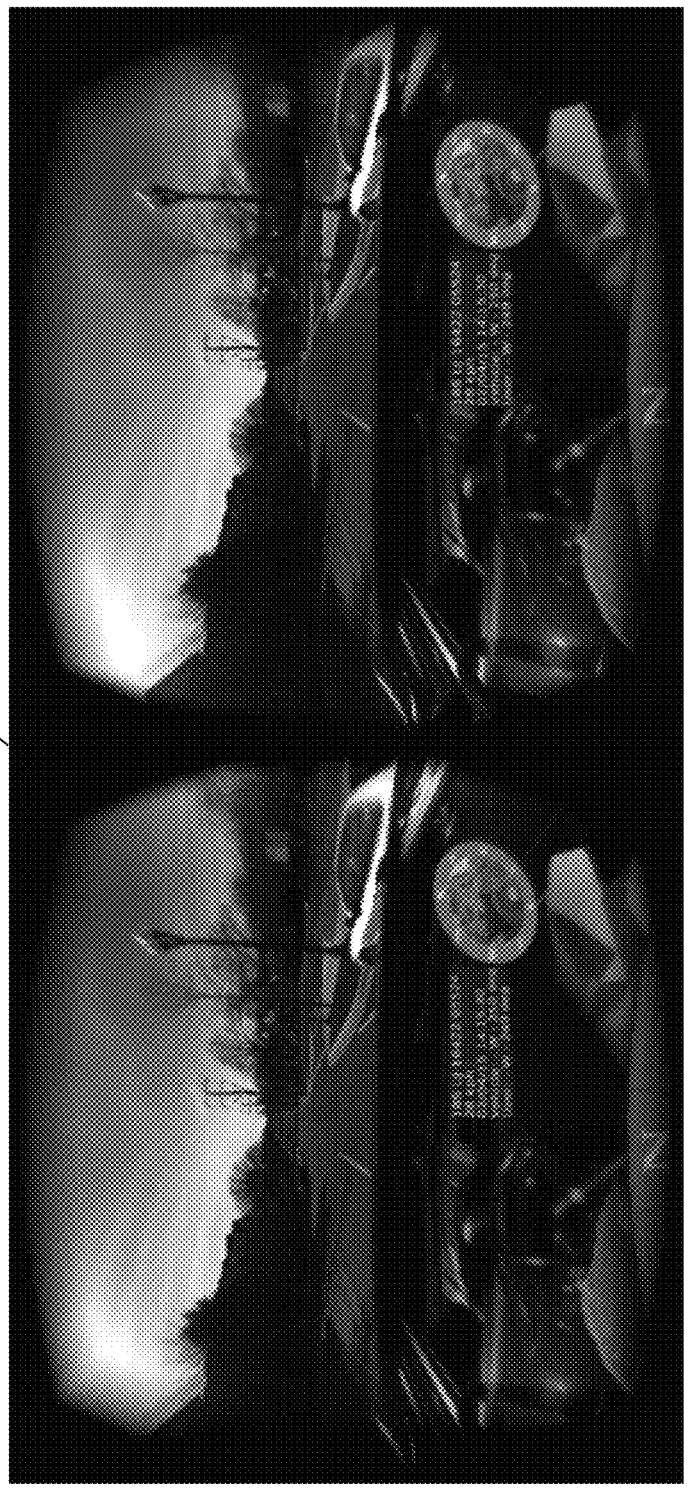
FIG. 1a illustrates the interface, through virtual reality stereo goggles, that display omni-directional field of view, as well as an integrated, blue force tracker-like map where the operator is looking forward.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

The proposed system is a point-and-click control method, where the operator selects a point in the image for the quadrotor to traverse. The operator selects a distance, and the quadrotor will traverse a straight (or curved) line between its current location and the point selected in the image. In the proposed system, the point selection is performed using a set of virtual reality stereo goggles (i.e. Oculus Rift). The operator is given an omni-directional image, where—by moving his/her head around—he/she can observe the area surrounding the UAV. The glove is used as a virtual mouse, selecting the point where the operator desires the UAV to go, as well as a selecting how far, in that direction, the quadrotor should automatically move.

In this modality, the quadrotor will automate a variety of functions for the operator. The system keeps track of the various poses of the virtual reality stereo goggles; it also keeps track of the location of the pointer, shown three-dimensionally in the image inside those virtual reality stereo goggles. In addition, it keeps track of the pose of the quadrotor from when that image was collected. Finally, by time-tagging and transforming all of those poses, it is capable of figuring out the direction the quadrotor needs to follow. If the IMU on the quadrotor has not drifted, the transformation between the points indicated by the operator, and the direction of travel of the quadrotor, should be exact—regardless of time drift in the system. This technique borrows from a program that the inventors are currently developing for teleoperating (air, ground, sea, undersea, or in space); in situations with long communications delay.

Once the operator has indicated the point in space where he would like the quadrotor to go, he is free to look around through the omnidirectional camera, which would provide significant improvement in situational awareness. Once the vehicle achieves the assigned point, it will hover until a new point is assigned. In the meantime, while the quadrotor is traversing to the assigned location, the operator can observe the scene by moving his head.

The operator's selection of the point for the UAV's traversal, is independent of the intermediate and final poses of the UAV. All the control necessary to turn, rotate, and stabilize the quadrotor in its way-assigned point is fully automated, and does not need to be supervised by the operator. Aerodynamic effects, created by the proximity to walls or to the ground, are locally counteracted by the on-board control loop.

The advantages of the proposed approach include:

This low-level control loop is significantly faster than the commonly-used teleoperation loop, which requires video or a sequence of images to be sent to the OCU and commands to be returned to the vehicle. Therefore, the system is capable of more rapidly correcting for stability.

The operator does not need to be trained to handle these aerodynmic effects, which are the common causes of UAV crashes.

By freeing the operator from the usual chores of teleoperation, the operator has time to acquire better situational awareness of the space around the quadrotor.

Even though we are sending the operator an omni-directional image of the space, these images do not need to be sent at high rates. On the contrary, we expect these images to be high-resolution, but very low frame rate—less than 1 hz. Therefore, we also expect this technique to use significantly less bandwidth than teleoperation.

Because time and location tagged images are available at the OCU, they become an automated method for collecting the information necessary to enable flashback.

Because the technique does not rely on fast, round-trip communications between the platform and the OCU to maintain its stability, the technique is significantly better suited for situations involving significant delay (multi-hop radius or SATCOM).

Because the proposed technique does not require any expensive or heavy sensors, it will still maintain the cost of the quadrotor low.

The challenges of the proposed approach are as follows:

The quadrotor requires an omni-directional camera; or, at least, a camera that provides significantly large field-of-view. For this application, we will leverage smartphone technology that uses inexpensive lenses, and should create fish-eye field-of-views. These lenses are inexpensive, and available in a variety of sizes and shapes.

Although there are no issues maintaining the Euler angles given the accuracy of the gyros, there are still issues in double-integrating the accelerometers, to ensure that the trajectory assigned is correctly followed. A model of motion of the vehicle is used to predict the trajectory being expressed on the display The unaided, relative position between the starting location and the ending location assigned by the operator will drift significantly if the double-integration is performed over a significant amount of time. This is not a new problem; Instant Eye and other quadrotors zero-out the accelerometer grips by utilizing a variety of tricks. One such trick uses the downward-looking camera and ultrasound sensors to zero-out this error. A second approach, utilized by a variety of short-range missiles, uses the target image in order to guide both the heading and the position of the projectile.

The final challenge is the form factor of the virtual reality stereo goggles or display worn by the operator for the operator. Current operators are not used to carrying the stereo goggles, and we will have to find stereo goggles well-suited to operator environments. Fortunately, the Army is looking at a variety of stereo goggles that can provide this functionality.

Figure 1B:
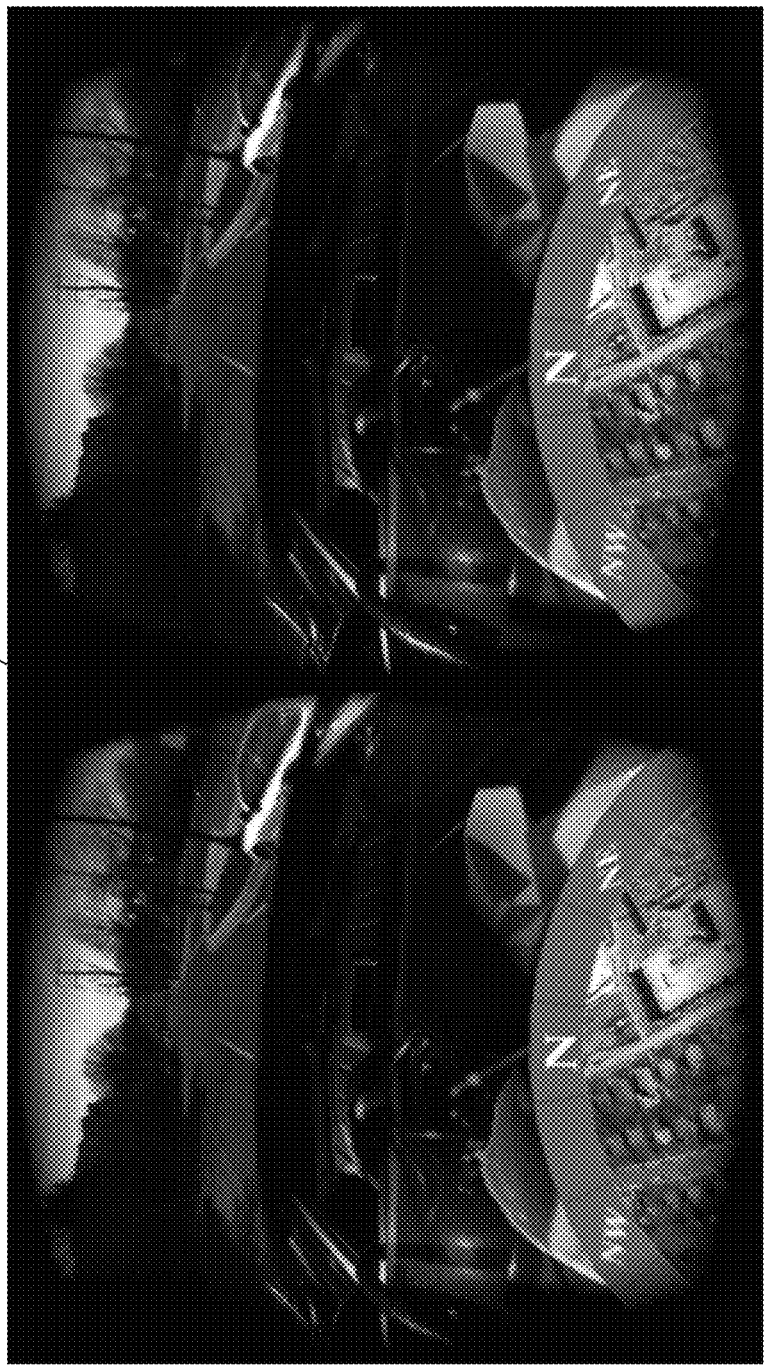
FIGS. 1b-1c illustrate the interface, through virtual reality stereo goggles, that display omni-directional field of view, as well as an integrated, blue force tracker-like map where the operator is looking down.
Figure 1C:
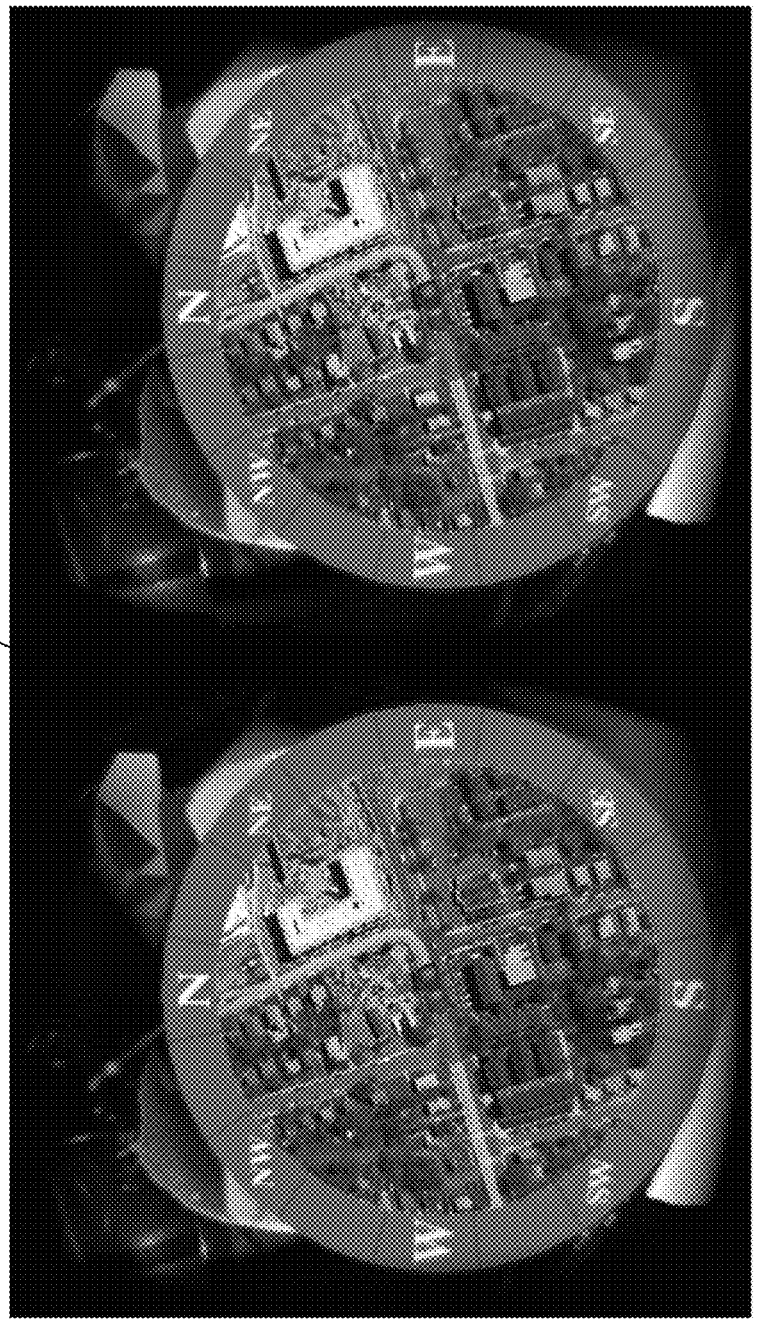

The present invention is based on a virtual reality interface. The system shown in FIGS. 1a-1c is designed to provide situational awareness to users traveling inside a windowless vehicles. A single, omni-directional camera, installed on top of the ground vehicle, provides the imagery necessary to feed the virtual reality stereo goggles worn by all occupants of the vehicle. As the vehicle traverses the route towards the mission drop-off point, the users are capable of looking at the terrain and understanding the scene. Ultimately, when the doors open and they have to leave the protection of the vehicle, they minimize the time necessary for understanding their surroundings.

The interface is composed of a few different widgets. As the operator moves their head, the virtual reality stereo goggles track the different positions of all the users' heads in the vehicle. By comparing these poses with the poses of the omni-directional camera mounted to the vehicle, a real-time stabilization mechanism is utilized, maintaining stable imagery. To the operator, it is as if they are looking out of a window, without being influenced by the vibrations and motions of the vehicle. The imagery is complimented with maps showing the location of the vehicle, as well as the trajectory being followed. As the users look down, a top-down view of the map is shown in real time. The pictures 100, 101, and 102 from FIGS. 1a-1c show a user looking forward in the direction of travel 100, then looking lower 101, then looking down 102. One can see the transition between the forward-looking 100 and top view maps 103, as depicted in his stereo goggles.

Figure 2:
FIG. 2 illustrates the proposed interface projects a 3-D occupancy box into the virtual reality stereo goggles, which represents, to the operator, the goal location of the quadrotor.

FIG. 2 shows a preliminary concept interface where the operator, utilizing a virtual reality glove, selects a point in the imagery 200 presented in the virtual reality stereo goggles. When the operator selects a point, a box 201, similar to the one shown in FIG. 2, will show the operator the final location placement of the UAV in 3D space. The interface will also provide the operator with coarse distance measurements 202, provided by the acoustic sensors.

To summarize, the operator will find, by moving his head, the location where he would like the quadrotor to go, then use the glove to select a point in the 3D imagery. That point will indicate the perceived range of the location, and draw a 3D prediction of where the quadrotor will traverse in order to achieve that location. The operator can adjust the "depth" of the traversal; in this case, how close it will get to the wall. Finally, it will press execute. The quadrotor—after the correct intermediate and final pose changes are taken under consideration—will control itself, staying within the corridor indicated in the operators 3D stereo goggles. While the traversal is executed, the location of the desired goal and the perceived distances until collision will be updated on the operator's visor.

The proposed technique outlines a new control mechanism well-suited for small, unmanned aerial vehicles traversing in GPS-denied areas. It has the strong advantage of simplifying the interface, so that even an untrained operator can handle the difficult, dynamic problems encountered in closed quarters. The proposed system seamlessly integrates point-and-click control with way-point navigation, in an intuitive interface. An additional advantage of the proposed system is that it adds minimal hardware to the payload of the UAV, and can possibly, strongly diminish the bandwidth and delay effects of the communication channel.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The invention claimed is:

1. A control system device comprising:
a teleoperated vehicle;
an omnidirectional camera or wide field of view camera mounted on the teleoperated vehicle;
a 3D display worn by an operator to visualize video or a sequence of images collected by the teleoperated vehicle;
a teleoperated vehicle control platform and an operator control unit (OCU) controlled by an operator providing communication between the teleoperated vehicle and the OCU;
a display overlay that indicates to the operator a desired goal location of the teleoperated vehicle;
a control system on the teleoperated vehicle that computes a control command given a motion that occurred during a communications delay between the teleoperated vehicle control platform and the operator control unit (OCU); and
a virtual reality glove allowing the operator to select a distance along a trajectory displayed in a pair of 3D display stereo goggles worn by the operator.

2. The device of claim 1, wherein the 3D display worn by an operator is a pair of 3D stereo goggles;
the 3D stereo goggles are further comprised of an embedded inertial measurement unit (IMU); and
wherein the pose of the head of the operator can be used to provide virtual reality.

3. The device of claim 2, further comprising a range sensor, wherein the range sensor is either acoustic or LADAR.

4. The device of claim 1, further comprising a range sensor that covers a direction of travel of the teleoperated vehicle.

5. The device of claim 1, wherein one or more overlays are displayed three dimensionally by the 3D display to express a trajectory and an assigned stopping location.

6. The device of claim 5, wherein a model of motion of the teleoperated vehicle is used to predict a trajectory being expressed on the 3D display.

7. The device of claim 1, further comprising displaying a rendering of a representation of the teleoperated vehicle.

8. The device of claim 1, wherein one or more omnidirectional cameras on the teleoperated vehicle provide stereo omnidirectional imagery or generate stereo image pairs by rotating the omnidirectional cameras.

9. The device of claim 1, wherein one or more Euler angles of the 3D display are used to steer the teleoperated vehicle toward a goal location or adjust a trajectory of the teleoperated vehicle.

10. The device of claim 1, wherein a 2D or 3D top view map showing the location and trajectory of the teleoperated vehicle is displayed either as an overlay or utilizing the areas in the hemisphere of the 3D display where the omnidirectional cameras do not cover.

11. The device of claim 1, wherein the operator can rewind a previously recorded imagery to a previous time and still select a goal point.

12. The device of claim 1, wherein a top view display of one or more obstacles found by the teleoperated vehicle are displayed on the 3D display.

13. The device of claim 1, further comprising a radio navigation unit that controls or guides the teleoperated vehicle to an assigned location.

14. A method for providing Point-and-Click Control of an Unmanned, Autonomous Vehicle Using Omni-Directional Visors, comprising the steps of:
providing a teleoperated vehicle;
mounting an omnidirectional camera or wide field of view camera on the teleoperated vehicle;
providing a 3D display worn by an operator to visualize video or a sequence of images collected by the teleoperated vehicle;
providing a teleoperated vehicle control platform and an operator control unit (OCU) controlled by an operator;
creating a display overlay that indicates to the operator a desired goal location of the teleoperated vehicle;
providing a 3D display to be worn by an operator in the form of a pair of 3D stereo goggles;

the 3D stereo goggles are further comprised of an embedded inertial measurement unit (IMU);

wherein the pose of the head of the operator can be used to provide virtual reality;

a virtual reality glove allowing the operator to select the distance along the trajectory displayed in the stereo goggles;

the operator will find, by moving his head, the location where he would like the quadrotor to go;

the operator will then use the glove to select a point in the 3D imagery;

this selected point will indicate the perceived range of the location;

the OCU will draw a 3D prediction of where the quadrotor will traverse in order to achieve that location;

the operator can adjust the depth of the traversal; in this case, how close it will get to a wall;

the operator will then press a button or provide other positive input to execute the movement;

a control system on the teleoperated vehicle that computes a control command given a motion that occurred during a communications delay between the teleoperated vehicle control platform and the operator control unit (OCU);

the quadrotor, after the correct intermediate and final pose changes are taken under consideration, will control itself, staying within the corridor indicated in the operators 3D stereo goggles; and while the traversal is executed, the location of the desired goal and the perceived distances until collision will be updated on the operator's visor;

generating a depiction of one or more intermediate poses and a final pose of a control system device; and selecting a final or intermediate pose.

* * * * *